United States Patent [19]
Dorenbosch et al.

[11] Patent Number: 6,154,500
[45] Date of Patent: Nov. 28, 2000

[54] METHOD AND APPARATUS IN A WIRELESS COMMUNICATION SYSTEM FOR ADDING A SECOND CHANNEL THAT OVERLAPS A GUARD BAND USED BY A FIRST CHANNEL

[75] Inventors: Jheroen Pieter Dorenbosch, Paradise; Stephen Rocco Carsello, Fort Worth, both of Tex.

[73] Assignee: Motorola, Inc., Schaumburg, Ill.

[21] Appl. No.: 09/083,250

[22] Filed: May 20, 1998

[51] Int. Cl.[7] .................................................. H04L 27/00
[52] U.S. Cl. ........................... 375/259; 375/261; 370/343
[58] Field of Search ..................................... 375/259, 260, 375/261, 264, 377; 370/342, 343, 344

[56] References Cited

U.S. PATENT DOCUMENTS

| | | | |
|---|---|---|---|
| 5,289,496 | 2/1994 | Nakagawa et al. | 375/1 |
| 5,327,245 | 7/1994 | Unetich et al. | 348/723 |
| 5,818,827 | 10/1998 | Usui et al. | 370/344 |

*Primary Examiner*—Stephen Chin
*Assistant Examiner*—Dac V. Ha
*Attorney, Agent, or Firm*—R. Louis Breeden

[57] ABSTRACT

In a wireless communication system a first transmission (612, 614) is sent (802) over a first channel to a first receiver (122) that requires a transmission-free guard band (620) during a tuning period, and the first receiver accommodates a second transmission (616) sent concurrently with the first transmission on a second channel that overlaps with spectrum occupied by the guard band. During the tuning period, the system disallows the second transmission, and the first receiver adjusts (804) a pass band of a radio frequency (RF) filter (302) therein such that the pass band includes the guard band. Thereafter, the first receiver tunes (806) to the first channel. During a time other than the tuning period, the first receiver readjusts (810) the pass band of the RF filter such that the pass band excludes the guard band. After the tuning period, the system allows the second transmission to be sent (812).

20 Claims, 4 Drawing Sheets

METHOD AND APPARATUS IN A WIRELESS COMMUNICATION SYSTEM FOR ADDING A SECOND CHANNEL THAT OVERLAPS A GUARD BAND USED BY A FIRST CHANNEL

FIELD OF THE INVENTION

This invention relates in general to wireless communication systems, and more specifically to a method and apparatus in a wireless communication system for facilitating a sending of a first transmission over a first channel to a first receiver that requires a transmission-free guard band during a tuning period, and further for accommodating a second transmission on a second channel that overlaps with spectrum occupied by the guard band, the second transmission sent concurrently with the first transmission.

BACKGROUND OF THE INVENTION

The receivers of prior art wireless communication systems have used radio frequency (RF) filters with wider pass bands than required to conform to the channel spacing of the transmissions. This has been done to accommodate a sufficiently large local oscillator (LO) tuning error in order to reduce the cost of the receivers, which have to be retuned to the center of the transmission channel during a tuning period. The use of the wider pass bands has resulted in a requirement for transmission-free "guard" bands surrounding each channel, thereby leaving some portions of the spectrum unused.

Modern wireless communication systems have developed new physical layers employing highly bandwidth-efficient modulation techniques, such as quadrature amplitude modulation (QAM), which can fit onto narrowband channels. Given the scarcity of radio spectrum, it would be highly desirable to utilize the unused portions of the spectrum of the prior art communication systems for transmitting at least a portion of one of the new narrowband channels.

Thus, what is needed is a method and apparatus in a wireless communication system for facilitating a sending of a first transmission over a first channel to a first receiver that requires a transmission-free guard band during the tuning period, and further for accommodating a second transmission on a second channel that overlaps with spectrum occupied by the guard band, the second transmission sent concurrently with the first transmission.

SUMMARY OF THE INVENTION

An aspect of the present invention is a method in a wireless communication system for facilitating a sending of a first transmission over a first channel to a first receiver that requires a transmission-free guard band during a tuning period, and further for accommodating a second transmission on a second channel that overlaps with spectrum occupied by the guard band, the second transmission sent concurrently with the first transmission. The method comprising, during the tuning period, the steps of disallowing the second transmission, adjusting a pass band of a radio frequency (RF) filter in the first receiver such that the pass band includes the guard band, and, thereafter, tuning the first receiver to the first channel. The method further comprises, during a time other than the tuning period, the steps of readjusting the pass band of the RF filter such that the pass band excludes the guard band, and, thereafter, allowing the second transmission.

Another aspect of the present invention is a controller in a wireless communication system for sending a first transmission over a first channel to a first receiver that requires a transmission-free guard band during a tuning period, and further for accommodating a second transmission on a second channel that overlaps with spectrum occupied by the guard band, the second transmission sent concurrently with the first transmission. The controller comprises a network interface for receiving messages sent in the first and second transmissions, and a processing system coupled to the network interface for processing the messages. The controller further comprises a base station interface coupled to the processing system for controlling a base station to generate the first and second transmissions. The processing system is programmed, during the tuning period, to disallow the second transmission; and to rely upon the first receiver to adjust a pass band of a radio frequency (RF) filter in the first receiver such that the pass band includes the guard band, and, thereafter, to tune itself to the first channel. The processing system is further programmed, during a time other than the tuning period, to rely upon the first receiver to readjust the pass band of the RF filter such that the pass band excludes the guard band; and then to allow the second transmission.

Another aspect of the present invention is a receiver in a wireless communication system, the receiver for receiving a first transmission over a first channel. The receiver requires a transmission-free guard band during a tuning period. The receiver is further for accommodating a second transmission on a second channel that overlaps with spectrum occupied by the guard band, the second transmission sent concurrently with the first transmission from a controller. The receiver comprises a receiver element for receiving the first transmission. The receiver element comprises an adjustable radio frequency (RF) filter for controlling a pass band of the receiver element. The receiver further comprises a processing system coupled to the receiver element for processing information sent in the first transmission, and a user interface coupled to the processing system for interfacing with a user. The processing system is programmed, during the tuning period, to rely upon the controller to disallow the second transmission, to adjust the pass band of the RF filter such that the pass band includes the guard band, and, thereafter, to tune the receiver to the first channel. The processing system is further programmed, during a time other than the tuning period, to readjust the pass band of the RF filter such that the pass band excludes the guard band, thereby enabling the receiver to receive the first transmission in the presence of the second transmission.

Another aspect of the present invention is a receiver in a wireless communication system. The receiver is for receiving a first transmission over one of at least one first channel also used by an additional receiving device that requires transmission-free guard bands during a tuning period. The receiver is further for receiving a second transmission on a second channel that overlaps with spectrum occupied by one of the guard bands, the second transmission sent concurrently with the first transmission. The receiver comprises a receiver element for receiving the first and second transmissions, and a processing system coupled to the receiver element for processing information sent in the first and second transmissions. The receiver further comprises a user interface coupled to the processing system for interfacing with a user. The processing system is programmed, during the tuning period, to tune the receiver element to the one of at least one first channel, and to minimize a tuning error of the receiver element by monitoring the first transmission. The processing system is programmed, during a time other than the tuning period, to tune the receiver element to the second channel, and to process the information sent in the second transmission.

DETAILED DESCRIPTION OF THE DRAWINGS

Figure 1:
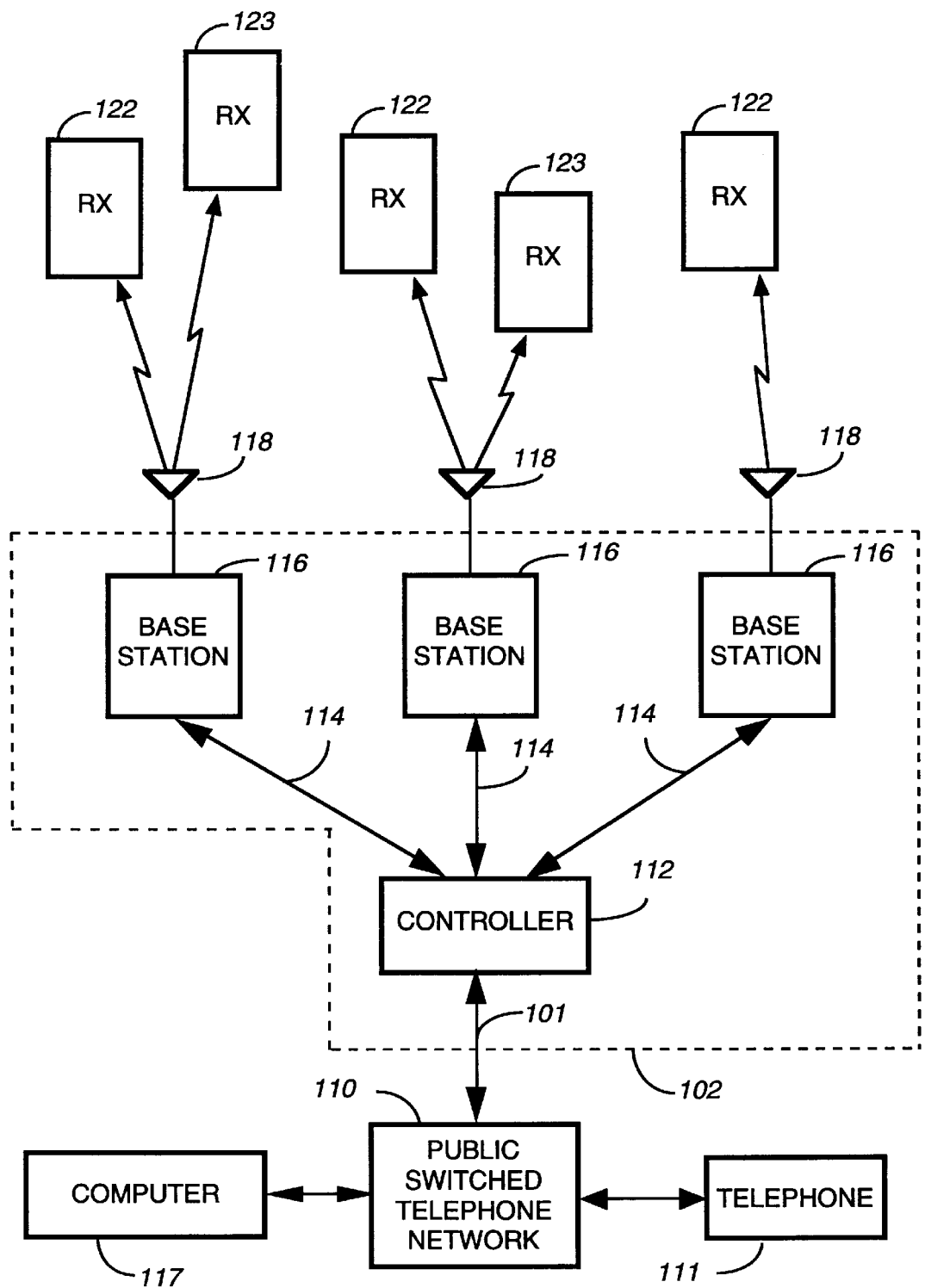
FIG. 1 is an electrical block diagram of an exemplary wireless communication system in accordance with the present invention.

FIG. 1 is an electrical block diagram of an exemplary wireless communication system in accordance with the present invention, comprising a fixed portion 102 including a controller 112 and a plurality of base stations 116, the wireless communication system also including a plurality of first and second receivers 122, 123. The base stations 116 preferably communicate with the receivers 122, 123 utilizing conventional radio frequency (RF) techniques, and are coupled by communication links 114 to the controller 112, which controls the base stations 116.

The hardware of the controller 112 is preferably a combination of the Wireless Messaging Gateway (WMG™) Administrator! paging terminal, and the RF-Conductor!™ message distributor manufactured by Motorola, Inc., and includes software modified in accordance with the present invention. The hardware of the base stations 116 is preferably similar to the RF-Orchestra! transmitter, modified through well-known techniques to include quadrature amplitude modulation (QAM) capability, and can include, in two-way wireless communication systems, the RF-Audience!™ receiver manufactured by Motorola, Inc. The receivers 122, 123 are preferably similar to the Advisor Gold™ and Pagefinder™ wireless communication units, also manufactured by Motorola, Inc., and have receiver elements and software modified in accordance with the present invention, as described further below. It will be appreciated that other similar hardware can be utilized as well for the controller 112, the base stations 116, and the receivers 122, 123.

Each of the base stations 116 transmits RF signals in first and second transmissions to the first and second receivers 122, 123, respectively, via an antenna 118. The RF signals transmitted by the base stations 116 to the receivers 122, 123 (outbound messages) comprise selective call addresses identifying the receivers 122, 123, and voice and data messages originated by a caller, as well as commands originated by the controller 112 for adjusting operating parameters of the radio communication system.

The controller 112 preferably is coupled by telephone links 101 to a public switched telephone network (PSTN) 110 for receiving selective call message originations therefrom. Selective call originations comprising voice and data messages from the PSTN 110 can be generated, for example, from a conventional telephone 111 or a conventional computer 117 coupled to the PSTN 110. It will be appreciated that, alternatively, other types of communication networks, e.g., packet switched networks, the Internet, and local area networks, can be utilized as well for transporting originated messages to the controller 112.

The over-the-air protocol utilized for the first transmission is preferably selected from Motorola's well-known FLEX™ family of digital selective call signaling protocols. The over-the-air protocol utilized for the second transmission is similar to the FLEX™ family, but modified through well-known techniques to utilize quadrature amplitude modulation (QAM) at the physical layer. These protocols utilize well-known error detection and error correction techniques and are therefore tolerant to bit errors occurring during transmission, provided that the bit errors are not too numerous. It will be appreciated that other suitable protocols can be used as well. It will be further appreciated that, while one embodiment for practicing the present invention is a one-way wireless communication system, the present invention is applicable also to a two-way wireless communication system.

Figure 2:
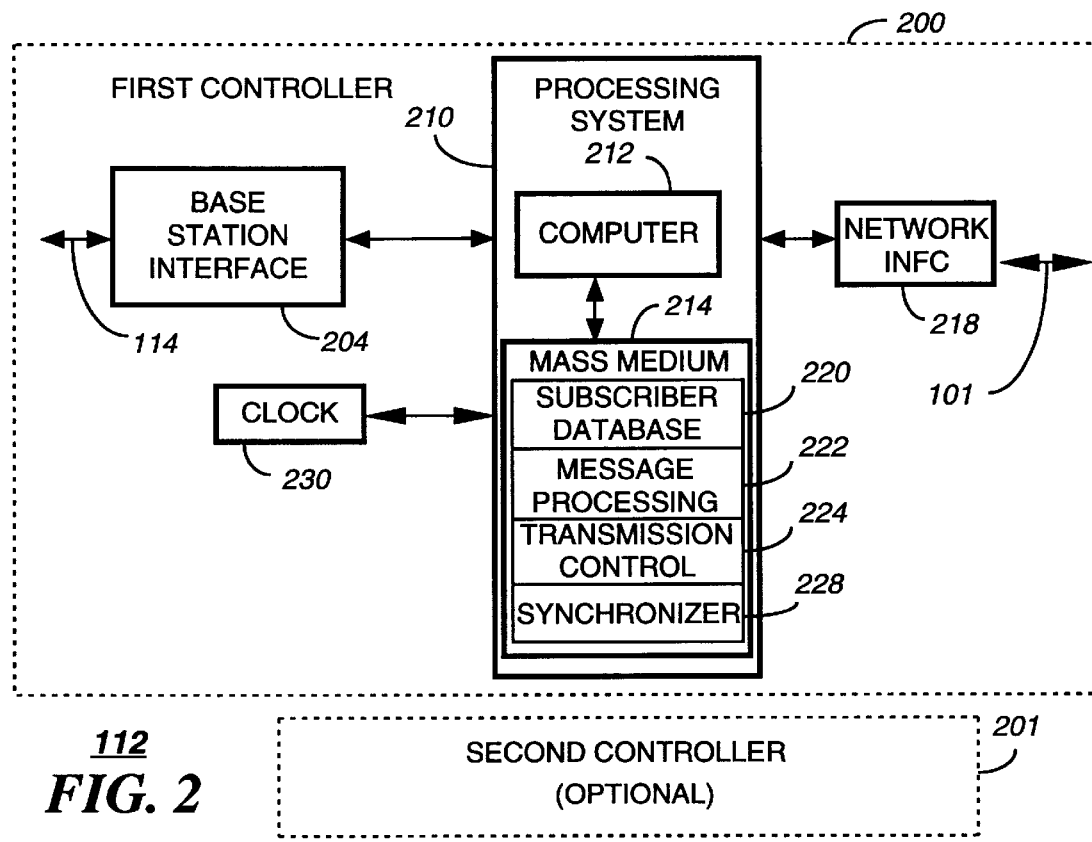
FIG. 2 is an electrical block diagram of an exemplary controller in accordance with the present invention.

FIG. 2 is an electrical block diagram depicting an exemplary controller 112 in accordance with the present invention. The controller 112 comprises a network interface 218 for receiving a message from a message originator via the telephone links 101. The network interface 218 is coupled to a processing system 210 for controlling and communicating with the network interface 218. The processing system is coupled to a base station interface 204 for controlling and communicating with the base stations 116 via the communication links 114. The processing system 210 is also coupled to a conventional clock 230 for providing a timing signal to the processing system 210. The processing system 210 comprises a conventional computer 212 and a conventional mass medium 214, e.g., a magnetic disk drive, programmed with information and operating software in accordance with the present invention. The mass medium 214 comprises a subscriber database 220, including information about the receivers 122, 123 controlled by the controller 112. The mass medium 214 also includes a message processing element 222 for programming the processing system 210 to process messages for the receivers 122, 123 in accordance with the present invention. The mass medium 214 also includes a transmission control element 224 for programming the processing system to control first and second transmissions in accordance with the present invention. The mass medium 214 further comprises a synchronizer 228 for programming the processing system 210 to synchronize the first and second transmissions with one another. It will be appreciated that, alternatively, in one embodiment the controller 112 can comprise first and second controllers 200, 201. In this embodiment the first controller 200 can, for example, control a first transmission sent on a first channel to the first receivers 122, while the second controller 201 controls a second transmission sent on a second channel to the second receivers 123. It will be further appreciated that the first and second controllers 200, 201 are not required to be similar to each other.

Figure 3:
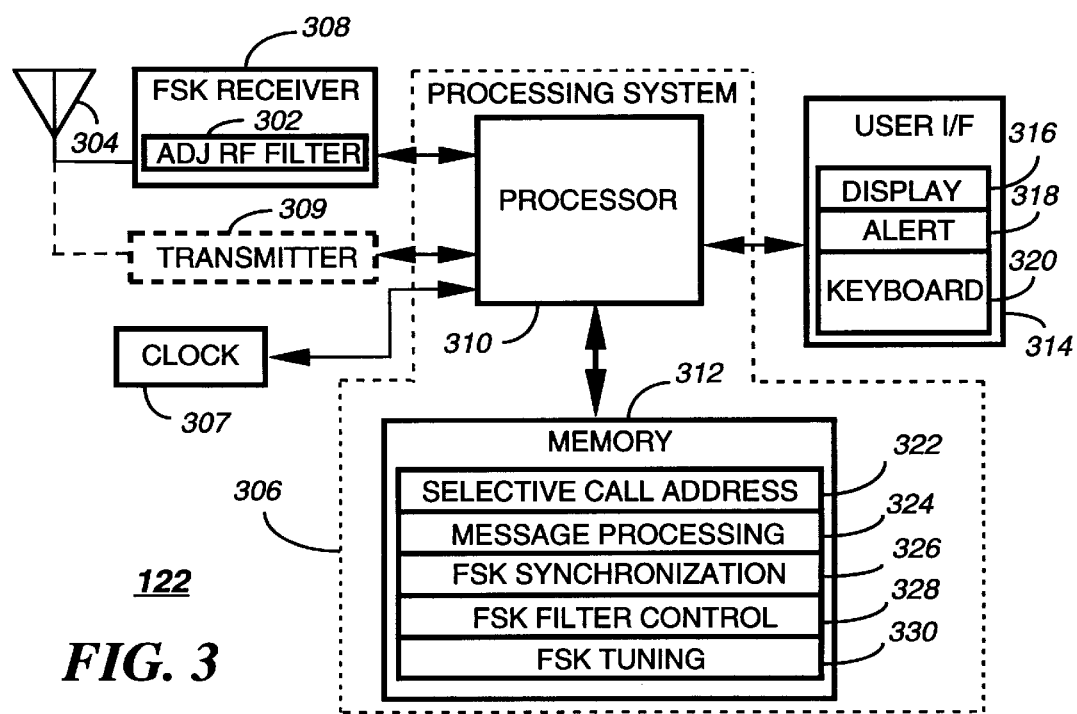
FIG. 3 is an electrical block diagram of an exemplary first receiver in accordance with the present invention.

FIG. 3 is an electrical block diagram of an exemplary first receiver 122 in accordance with the present invention. The first receiver 122 comprises an antenna 304 for intercepting an outbound message and (optionally, in two-way systems) for transmitting an inbound message to a base receiver (not shown). The antenna 304 is coupled to a frequency shift keyed (FSK) receiver element 308 for receiving the outbound message and (optionally) is coupled to a conventional transmitter 309 for transmitting the inbound message. The FSK receiver element 308 and the (optional) transmitter 309 are coupled to a processing system 306 for processing the messages and for controlling the receiver 122 in accordance with the present invention. The FSK receiver element 308 preferably includes a conventional adjustable radio frequency (RF) filter 302 for adjusting the pass band of the FSK receiver element 308 in accordance with the present invention. The adjustable RF filter is preferably an intermediate frequency (IF) filter realized and adjusted through software in a conventional digital signal processor, using well-known techniques.

It will be appreciated that, alternatively, the adjustable RF filter 302 can be realized through other means, such as through a switchable hardware filter. The FSK receiver element 308 also includes a conventional local oscillator (LO) (not shown) for maintaining a tuning error of the FSK receiver element 308 within a predetermined range, through well-known techniques.

A user interface 314 preferably is also coupled to the processing system 306 for interfacing with a user. The user interface 314 preferably comprises a conventional display 316 for displaying the messages, a conventional alert element 318 for alerting the user when a message arrives, and a conventional keyboard 320 for controlling the first receiver 122. A conventional clock 307 is also coupled to the processing system 306 for supporting time keeping requirements of the first receiver 122.

The processing system 306 comprises a conventional processor 310 and a conventional memory 312. The memory 312 comprises software elements and other variables for programming the processing system 306 in accordance with the present invention. The memory 312 preferably includes a selective call address 322 to which the first receiver 122 is responsive. In addition, the memory 312 includes a message processing element 324 for programming the processing system 306 to process messages through well-known techniques. The memory 312 further comprises an FSK synchronization element 326 for programming the processing system 306 to maintain synchronization between the first receiver 122 and the transmissions of the base stations 116 during a tuning period. The memory 312 also includes an FSK filter control element 328 for programming the processing system 306 to control the pass band of the RF filter 302 in accordance with the present invention. In addition, the memory comprises an FSK tuning element 330 for programming the processing system 306 to tune the FSK receiver element 308 to the center of a first channel during the tuning period through well-known automatic frequency control (AFC) techniques.

Figure 4:
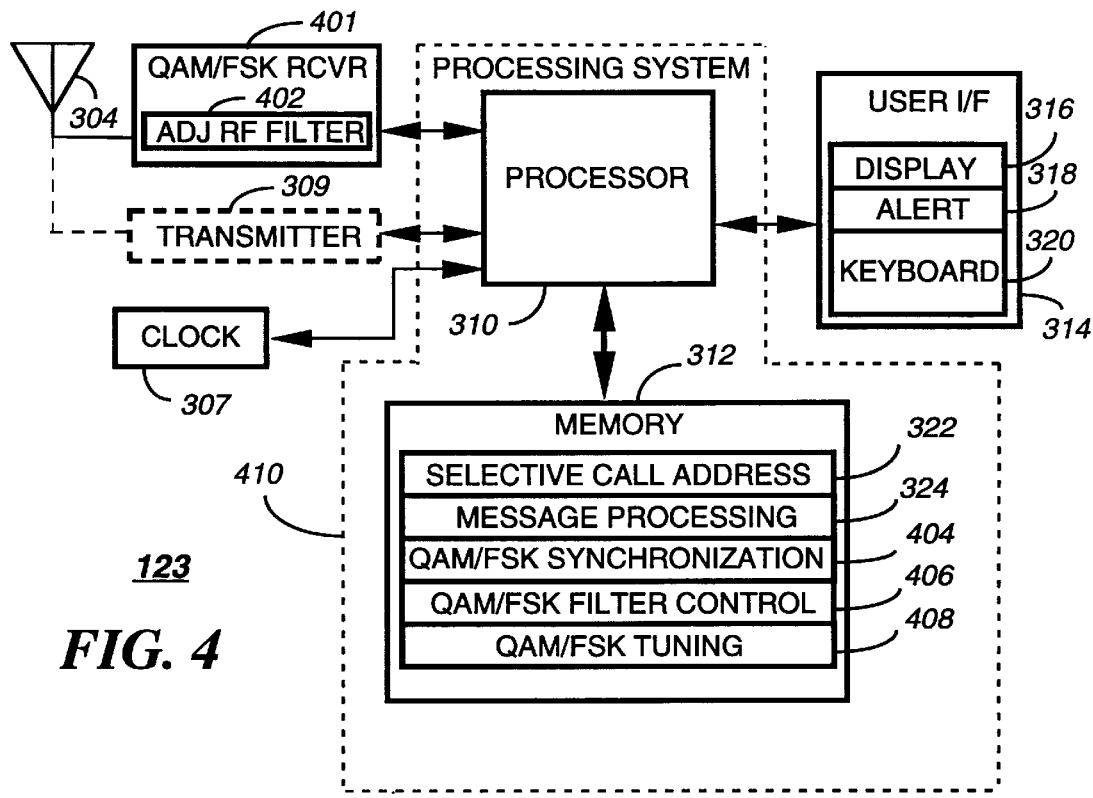
FIG. 4 is an electrical block diagram of an exemplary second receiver in accordance with the present invention.

FIG. 4 is an electrical block diagram of an exemplary second receiver 123 in accordance with the present invention. The second receiver 123 is similar to the first receiver 122, the essential difference being that the second receiver 123 includes a quadrature amplitude modulation (QAM) and FSK receiver element 401 coupled to a processing system 410, instead of having the FSK receiver element 308 coupled to the processing system 306. Preferably, the FSK functionality of the second receiver 123 is sufficient for LO error minimization and rough synchronization from an FSK synchronization signal. In addition, the QAM/FSK receiver element 401 includes an adjustable RF filter 402, which is utilized somewhat differently from the RF filter 302, as explained further below. The QAM/FSK receiver element 401 also includes a conventional local oscillator (LO) (not shown) for maintaining a tuning error of the QAM/FSK receiver element within a predetermined range through well-known techniques. Also, in the memory 312 the QAM/FSK synchronization element 404, the QAM/FSK filter control element 406, and the QAM/FSK tuning element 408 replace the FSK synchronization element 326, the FSK filter control element 328, and the FSK tuning element 330, respectively. Operation of the QAM/FSK synchronization element 404, the QAM/FSK filter control element 406, and the QAM/FSK tuning element 408 will be described further below.

Figure 5:
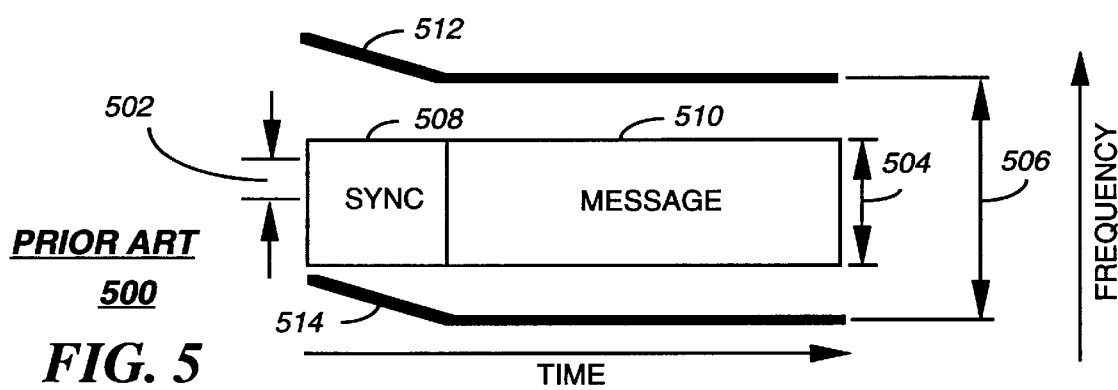
FIG. 5 is a timing diagram depicting a tuning operation of a prior art RF filter.

FIG. 5 is an exemplary timing diagram 500 depicting a tuning operation of a prior art RF filter technique. The diagram 500 shows a received transmission of a synchronization signal 508 followed by a message 510. The synchronization signal 508 and the message 510 require a predetermined transmission bandwidth 504. The pass band limits 512, 514 of the prior art RF filter are depicted by first and second heavy lines. Receiver local oscillator (LO) frequency error is depicted by the length 502. Note that the width 506 of the pass band of the prior art RF filter is larger than the required transmission bandwidth 504 and is fixed over time, while the center frequency of the pass band is adjusted over time through AFC techniques during the synchronization signal 508 to minimize the LO error. The large width 506 is used so that the synchronization signal 508 will fall within the pass band of the filter even when the LO error is large before being minimized through the AFC techniques. The ability to tolerate a large LO error advantageously allows a lower cost LO to be used. The price paid in the prior art RF filter, however, is that the difference between the width 506 of the pass band of the prior art RF filter and the required transmission bandwidth 504 requires two "guard" bands on either side of the required transmission bandwidth 504 that cannot be used for transmitting anything.

Figure 6:
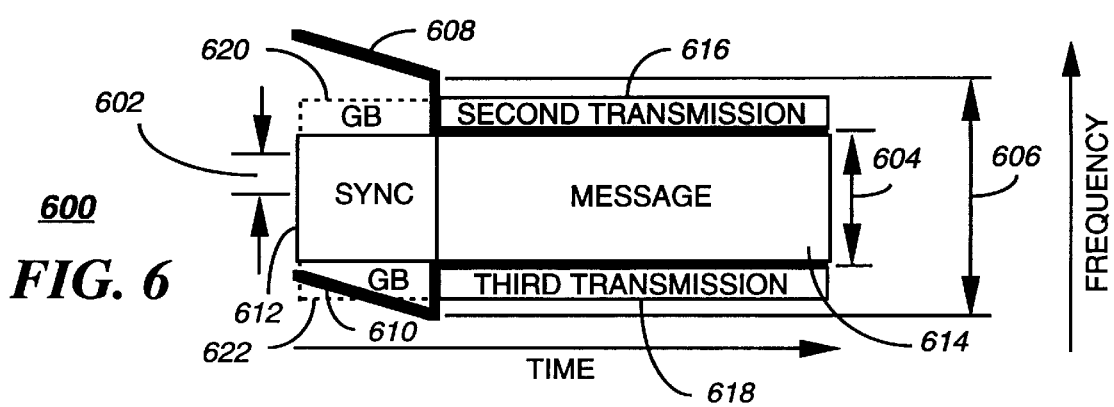
FIG. 6 is an exemplary timing diagram depicting operation of an RF filter during and after a tuning period in accordance with the present invention.

FIG. 6 is an exemplary timing diagram 600 depicting operation of the adjustable RF filter 302 during and after a tuning period in accordance with the present invention. The diagram 600 shows a received first transmission comprising a synchronization signal 612 followed by a message 614. The tuning period corresponds to the period during which the synchronization signal 612 is present. The synchronization signal 612 and the message 614 require a predetermined transmission bandwidth 604. The pass band limits 608, 610 of the RF filter 302 are depicted by first and second heavy lines. Receiver local oscillator (LO) frequency error is depicted by the length 602. Note that the width 606 of the pass band of the prior art RF filter is larger than the required transmission bandwidth 604 during the tuning period to accommodate a large LO error, while the center frequency of the pass band is adjusted over time through AFC techniques during the tuning period to minimize the LO error. Note, however, that the pass band of the RF filter 302 is reduced after the tuning period to substantially that required to pass the predetermined transmission bandwidth 604. The advantageous result is that, during times other than the tuning period, a second transmission 616, such as a narrowband QAM transmission, can take place in a channel immediately adjacent to the channel sending the synchronization signal 612 and the message 614, and overlapping the spectrum formerly required for the transmission-free guard band in the prior art technique. It will be appreciated that, in addition, a third transmission 618 can occur on the opposite side of the channel, as well. Transmission-free guard bands 620, 622 still are preferred during the tuning period coincident with the synchronization signal 612, for reasons that will be explained further below.

Figure 7:
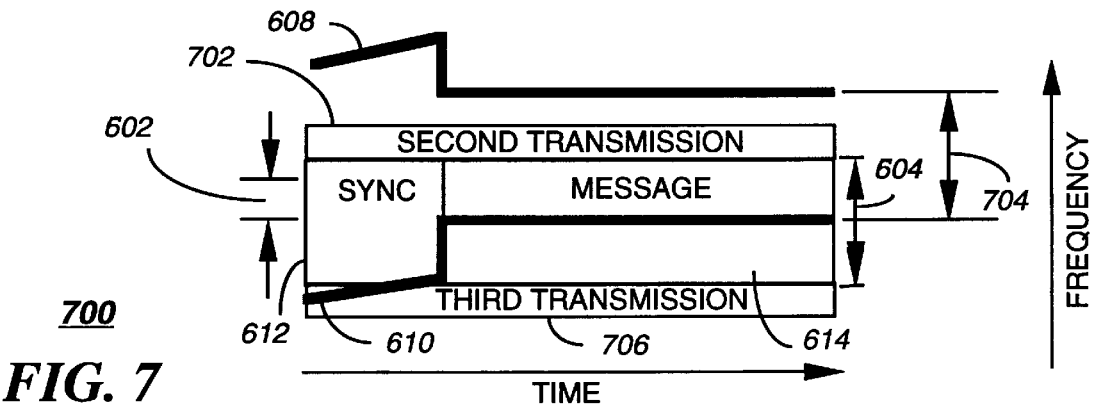
FIG. 7 is a timing diagram depicting a problem that can occur in the operation of the RF filter when a second transmission occurs in a guard band during the tuning period.

FIG. 7 is an exemplary timing diagram 700 depicting a problem that can occur in the operation of the RF filter when a second and/or third transmission 702, 706 occurs during the tuning period. The diagram 700 is similar to the diagram 600, the essential difference being that the second and third transmissions 702, 706 are present during the tuning period, i.e., during the synchronization signal 612. The result is that during the tuning period, the AFC techniques intended to correct the LO error can skew the pass band limits 608, 610 of the RF filter 302 towards the energy in the closer one of the second and third transmissions 702, 706, so that at the end of the tuning period the LO error has not been minimized and may even be worsened. While the width 704 of the pass band is correct, the position of the pass band is not, and the message 614 probably will not be receivable. To prevent this problem, the transmission-free guard bands 620, 622 (FIG. 6) are preferred.

Figure 8:
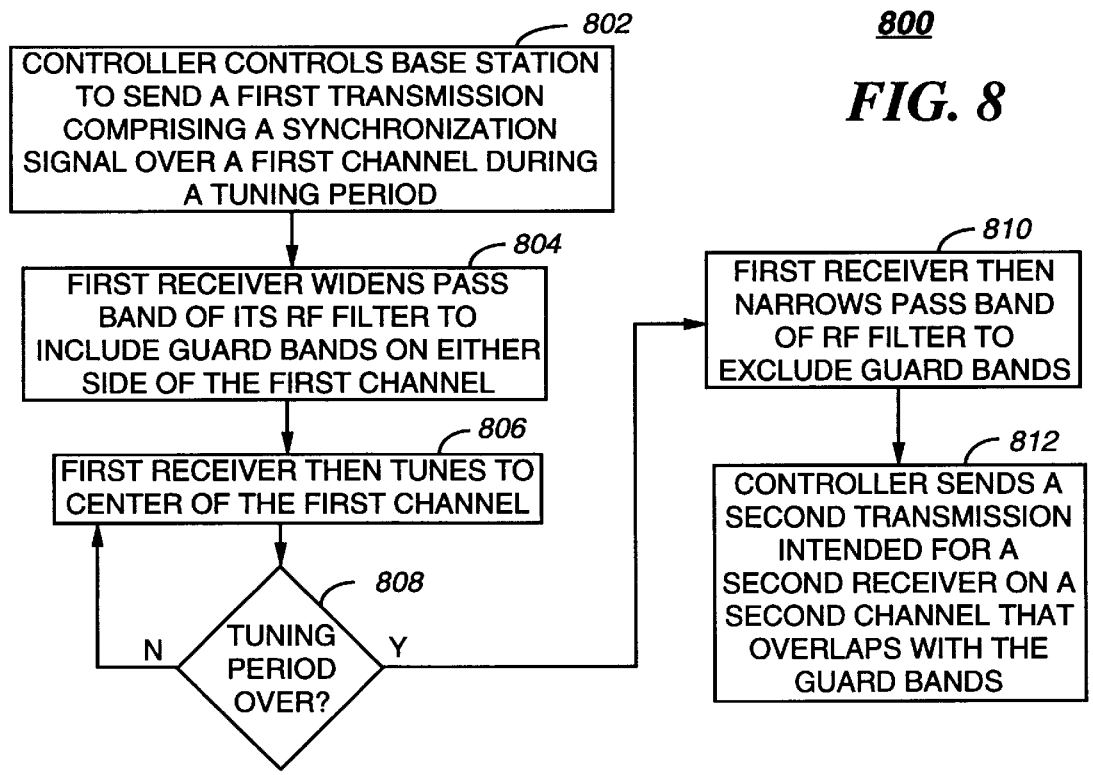
FIG. 8 is a flow diagram depicting the operation of the wireless communication system in accordance with the present invention.

FIG. 8 is an exemplary flow diagram 800 depicting the operation of the wireless communication system in accordance with the present invention. The flow begins with the controller 112 controlling 802 a base station 116 to send a first transmission comprising the synchronization signal 612 over a first channel (depicted by the predetermined transmission bandwidth 604) during a tuning period (coincident with the duration of the synchronization signal 612). The first transmission further comprises the message 614, which is sent at a time other than the tuning period, e.g., after the tuning period. During the tuning period, the controller 112 disallows any transmissions that would overlap with the guard bands 620, 622. In searching for the synchronization signal, the first receiver 122 relies upon the controller 112 to disallow the second transmission, and the processing system 306 of the first receiver 122 accesses the FSK filter control element 328 and widens 804 the pass band of the adjustable RF filter 302 to include the guard bands 620, 622 on either side of the first channel. The widening of the pass band advantageously allows a looser tolerance for the tuning error of the LO in the FSK receiver element 308, thereby allowing a lower cost for the first receiver 122. In one embodiment, the first transmission is a wideband, e.g., 12.5 kHz wide, FSK transmission. Adding an initial LO error, e.g., ±1.75 kHz, increases the pass band of the RF filter 302 during the tuning period to 16 kHz. The processing system 306 then accesses the FSK tuning element 330 and the FSK synchronization element 326 to minimize the LO tuning error by tuning 806 the FSK receiver element 308 to substantially the center of the first channel and to synchronize the first receiver 122 with the first transmission, through well-known AFC and synchronization techniques.

The processing system 306 then checks 808 whether the predetermined duration of the tuning period has expired. If not, the processing system returns to step 806 to continue to tune and synchronize the first receiver 122. When the tuning period has expired, the processing system 306 then narrows 810 the pass band of the adjustable RF filter 302 to exclude the guard bands 620, 622. The controller 112 relies upon the first receiver 122 to narrow the pass band, and is then free to send 812 a second transmission 616 intended for the second receiver 123 on a second channel that overlaps with one of the guard bands 620, 622. It will be appreciated that, in addition, the controller 112 can send a third transmission 618 that overlaps with another one of the guard bands 620, 622. The second and third transmissions 616, 618 are synchronized with the first transmission, and can continue until the time arrives for a next tuning period, corresponding to the next synchronization signal 612.

In one embodiment, the second receiver 123 is a QAM/FSK receiver, and the second transmission 616 is a narrowband, e.g., 3.125 kHz wide, QAM transmission. Preferably, the processing system 410 accesses the QAM/FSK filter control element 406 and the QAM/FSK tuning element 408 during the tuning period to adjust the LO frequency of the QAM/FSK receiver element 401 and the adjustable RF filter 402, such that the second receiver 123 monitors the synchronization signal 612 of the first transmission, for minimizing its LO tuning error. Using this technique, the second receiver 123 can use a looser tolerance for its LO initial tuning error, thus advantageously reducing the cost of the QAM/FSK receiver element 401, as well.

In addition, the processing system 410 can access the QAM/FSK synchronization element 404 for establishing at least a rough synchronization with the synchronization signal 612 of the first transmission. Next, the processing system 410 can readjust the LO frequency of the QAM/FSK receiver element 401 and the adjustable RF filter 402, such that the second receiver 123 monitors an additional synchronization signal (not shown) present in the second transmission 616 to establish a fine synchronization and tuning with the second transmission 616. To do this, the processing system 410 of the second receiver 123 preferably accesses the QAM/FSK synchronization element 404 to synchronize the second receiver 123 with the additional synchronization signal of the second transmission, using well-known techniques. It will be appreciated that, in an alternative embodiment, the controller 112 can send a plurality of first transmissions on a plurality of first channels and that the second receiver 123 can monitor one of the plurality of first transmissions to acquire initial synchronization and/or tuning. In this alternative embodiment, the first transmission monitored by the second receiver 123 to acquire synchronization and/or tuning can be different from the first transmission whose guard band is utilized by the second receiver for receiving the second transmission 616. Also alternatively, the processing system 410 can skip the rough synchronization with the synchronization signal 612 of the first transmission and depend solely upon the additional synchronization signal present in the second transmission 616 to establish a fine synchronization and tuning with the second transmission 616.

It will be appreciated that the third transmission 618 can, for example, be similar to the second transmission 616 in type and operation. It will be further appreciated that the third transmission 618 can be different from the second transmission 616 in type and operation, as well, as long as the guard band 622 is kept transmission-free during the tuning period.

One additional implementation detail may be of interest. As described herein above, the embodiments have assumed that the first receiver 122 can synchronize with the first transmission on the first channel during a single tuning period. This assumption is true for a receiver that has identified and established communication with the first channel as its preferred channel. The assumption may not be true, however, for a receiver which has not determined a preferred channel, because, for example, the receiver has lost reception of the channel or has just been powered Lip. Such a receiver can need a longer time period to locate a suitable channel and synchronize with it. For this reason, it is preferred that periodically, e.g., once per minute, one frame, e.g., 1.875 seconds for FLEX™ protocol, of the first transmission be sent without any simultaneous second or third transmission in the adjacent spectrum. This will allow a receiver that has widened the pass band of its adjustable RF filter 302 for performing initial channel acquisition routines, to succeed in finding a pure first transmission, e.g., pure FSK, to lock onto.

Thus, it should be clear from the preceding disclosure that the present invention provides a method and apparatus in a wireless communication system which sends a first transmission over a first channel to a first receiver that requires a transmission-free guard band during a tuning period, and further advantageously accommodates a second transmission on a second channel that overlaps with spectrum occupied by the guard band, the second transmission sent concurrently with the first transmission. Many modifications and variations of the present invention are possible in light of the above teachings. For example, while the exemplary embodiments have discussed a mix of FSK and QAM channels, the present invention can be applied to many other modulation schemes, including a mix of two identical modulation schemes, e.g., FSK and FSK, using a common tuning and synchronization channel, along with adjustable RF filters. Thus, it is to be understood that, within the scope of the appended claims, the invention can be practiced other than as described herein above.

What is claimed is:

1. A method in a wireless communication system for facilitating a sending of a first transmission over a first channel to a first receiver that requires a transmission-free guard band during a tuning period, and further for accommodating a second transmission on a second channel that overlaps with spectrum occupied by the guard band, the second transmission sent concurrently with the first transmission, the method comprising, during the tuning period, the steps of:
disallowing the second transmission;
adjusting a pass band of a radio frequency (RF) filter in the first receiver such that the pass band includes the guard band; and
thereafter, tuning the first receiver to the first channel, the method further comprising, during a time other than the tuning period, the steps of:
readjusting the pass band of the RF filter such that the pass band excludes the guard band; and
thereafter, allowing the second transmission.

2. The method of claim 1,
wherein the second transmission is intended for a second receiver, and
wherein the first transmission and the second transmission are synchronized with one another, and
wherein the method further comprises the step of synchronizing the second receiver to the second transmission by monitoring the first transmission during the tuning period.

3. The method of claim 1, further comprising the step of sending a plurality of first transmissions over a plurality of first channels to a plurality of first receivers that require transmission-free guard bands during the tuning period, and
wherein the second transmission is intended for a second receiver, and
wherein the plurality of first transmissions and the second transmission are synchronized with one another, and
wherein the method further comprises the step of synchronizing the second receiver to the second transmission by monitoring one of the plurality of first transmissions during the tuning period.

4. The method of claim 1,
wherein the first transmission is a frequency shift keyed (FSK) transmission, and
wherein the second transmission is a quadrature amplitude modulated (QAM) transmission intended for a second receiver, and
wherein the method further comprises the step of sending a synchronization signal in the first transmission for synchronizing the first and second receivers.

5. The method of claim 1,
wherein the first receiver maintains a tuning error within a predetermined range, and
wherein the adjusting step comprises the step of widening the pass band to accommodate the predetermined range.

6. The method of claim 1,
wherein the second transmission is intended for a second receiver that can have a tuning error, and
wherein the method further comprises in the second receiver the step of monitoring the first transmission during the tuning period to minimize the tuning error.

7. The method of claim 1, further comprising the step of sending a plurality of first transmissions over a plurality of first channels to a plurality of first receivers that require transmission-free guard bands during the tuning period, and
wherein the second transmission is intended for a second receiver that can have a tuning error, and
wherein the method further comprises in the second receiver the step of monitoring one of the plurality of first transmissions during the tuning period to minimize the tuning error.

8. A controller in a wireless communication system for sending a first transmission over a first channel to a first receiver that requires a transmission-free guard band during a tuning period, and further for accommodating a second transmission on a second channel that overlaps with spectrum occupied by the guard band, the second transmission sent concurrently with the first transmission, the controller comprising:

a network interface for receiving messages sent in the first and second transmissions;
a processing system coupled to the network interface for processing the messages;
and a base station interface coupled to the processing system for controlling a base station to generate the first and second transmissions,
wherein the processing system is programmed, during the tuning period, to:
disallow the second transmission; and
rely upon the first receiver to:
adjust a pass band of a radio frequency (RF) filter in the first receiver such that the pass band includes the guard band; and
thereafter, tune itself to the first channel, and
wherein the processing system is further programmed, during a time other than the tuning period, to:
rely upon the first receiver to readjust the pass band of the RF filter such that the pass band excludes the guard band; and
allow the second transmission.

9. The controller of claim 8,
wherein the processing system is further programmed to maintain synchronization between the first transmission and the second transmission.

10. The controller of claim 8,
wherein the first transmission is a frequency shift keyed (FSK) transmission, and
wherein the second transmission is a quadrature amplitude modulated (QAM) transmission intended for a second receiver, and
wherein the processing system is further programmed to send a synchronization signal in the first transmission for synchronizing the first and second receivers.

11. The controller of claim 8, wherein the processing system is further programmed to send a plurality of first transmissions over a plurality of first channels to a plurality of first receivers that require transmission-free guard bands during the tuning period, and wherein the plurality of first transmissions are frequency shift keyed (FSK) transmissions, and wherein the second transmission is a quadrature amplitude modulated (QAM) transmission intended for a second receiver, and wherein the processing system is further programmed to send a synchronization signal in the plurality of first transmissions for synchronizing the plurality of first receivers and the second receiver.

12. The controller of claim 8, further comprising first and second controllers, wherein the first controller is arranged to control the first transmission, and wherein the second controller is arranged to control the second transmission.

13. A receiver in a wireless communication system, the receiver for receiving a first transmission over a first channel, wherein the receiver requires a transmission-free guard band during a tuning period, the receiver further for accommodating a second transmission on a second channel that overlaps with spectrum occupied by the guard band, the second transmission sent concurrently with the first transmission from a controller, the receiver comprising:

a receiver element for receiving the first transmission, the receiver element comprising an adjustable radio frequency (RF) filter for controlling a pass band of the receiver element;

a processing system coupled to the receiver element for processing information sent in the first transmission; and a user interface coupled to the processing system for interfacing with a user, wherein the processing system is programmed, during the tuning period, to:

rely upon the controller to disallow the second transmission;

adjust the pass band of the RF filter such that the pass band includes the guard band; and thereafter, tune the receiver to the first channel, and wherein the processing system is further programmed, during a time other than the tuning period, to readjust the pass band of the RF filter such that the pass band excludes the guard band, thereby enabling the receiver to receive the first transmission whether or not the second transmission is present.

14. The receiver of claim 13, wherein the first transmission is a frequency shift keyed (FSK) transmission including a synchronization signal, and wherein the second transmission is a quadrature amplitude modulated (QAM) transmission intended for a second receiver, and wherein the processing system is further programmed to synchronize the receiver with the synchronization signal.

15. The receiver of claim 13, wherein the receiver maintains a tuning error within a predetermined range, and wherein the processing system is further programmed to widen the pass band to accommodate the predetermined range.

16. A receiver in a wireless communication system, the receiver for receiving a first transmission over one of at least one first channel also used by an additional receiving device that requires transmission-free guard bands during a tuning period, the receiver further for receiving a second transmission on a second channel that overlaps with spectrum occupied by one of the guard bands, the second transmission sent concurrently with the first transmission, the receiver comprising:

a receiver element for receiving the first and second transmissions;

a processing system coupled to the receiver element for processing information sent in the first and second transmissions; and a user interface coupled to the processing system for interfacing with a user, wherein the processing system is programmed, during the tuning period, to:

tune the receiver element to the one of the at least one first channel, and minimize a tuning error of the receiver element by monitoring the first transmission, and wherein the processing system is programmed, during a time other than the tuning period, to:

tune the receiver element to the second channel; and process the information sent in the second transmission.

17. The receiver of claim 16, wherein the receiver element and the processing system are arranged to cooperate to receive and decode the information sent in the first transmission as a frequency shift keyed (FSK) transmission, and to receive and decode the information sent in the second transmission as a quadrature amplitude modulated (QAM) transmission.

18. The receiver of claim 16, wherein the receiver element comprises an adjustable radio frequency (RF) filter for controlling a pass band of the receiver element, and wherein the processing system is further programmed to adjust the adjustable RF filter in accordance with a bandwidth of the first and second transmissions and further in accordance with a tuning error of the receiver element.

19. The receiver of claim 16, wherein the processing system is further programmed, during the tuning period, to synchronize the receiver with a synchronization signal present in the first transmission.

20. The receiver of claim 16, wherein the processing system is further programmed, after the tuning period, to synchronize the receiver with a synchronization signal present in the second transmission.

* * * * *